United States Patent [19]

Matsuda

[11] Patent Number: 5,607,763
[45] Date of Patent: Mar. 4, 1997

[54] DECORATIVE FILM WITH PSA FOR EASY APPLICATION

[75] Inventor: Hiroshi Matsuda, Yamagato Prefecture, Japan

[73] Assignee: Minnesota Mining and Manufacturing Company, St. Paul, Minn.

[21] Appl. No.: 449,055

[22] Filed: May 24, 1995

Related U.S. Application Data

[63] Continuation of Ser. No. 211,192, filed as PCT/US94/03180, Mar. 23, 1994, abandoned.

[30] Foreign Application Priority Data

Apr. 7, 1993 [JP] Japan .................... 5-080579

[51] Int. Cl.$^6$ .................... B32B 5/16
[52] U.S. Cl. ............. 428/323; 428/304.4; 428/325; 428/341; 428/361; 428/403; 428/406; 428/411.1
[58] Field of Search .................... 428/355, 323, 428/327, 328, 343, 304.4, 325, 341, 361, 403, 406, 411.1; 525/221, 196, 522, 146

[56] References Cited

U.S. PATENT DOCUMENTS

| | | | |
|---|---|---|---|
| 3,301,741 | 1/1967 | Henrickson et al. | 161/119 |
| 4,983,436 | 1/1991 | Bailey et al. | 428/40 |
| 5,045,569 | 9/1991 | Delgado | 521/60 |
| 5,053,436 | 10/1991 | Delgado | 521/64 |
| 5,141,790 | 8/1992 | Calhoun et al. | 428/40 |
| 5,196,246 | 3/1993 | Kauss et al. | 428/39 |
| 5,198,301 | 3/1993 | Hager et al. | 428/355 |

FOREIGN PATENT DOCUMENTS

| | | | |
|---|---|---|---|
| 0257984A2 | 3/1988 | European Pat. Off. | C09J 7/02 |
| 0419020A1 | 3/1991 | European Pat. Off. | C09J 133/06 |
| 3537433A1 | 4/1985 | Germany | C09J 7/02 |
| 45-17074 | 6/1970 | Japan . | |
| 59-763 | 1/1984 | Japan | B65D 63/10 |
| 61-168146 | 7/1986 | Japan | G11B 7/24 |
| 2-45582 | 2/1990 | Japan | C09J 7/02 |

*Primary Examiner*—William A. Krynski
*Attorney, Agent, or Firm*—Gary L. Griswold; Walter N. Kirn; Carolyn V. Peters

[57] ABSTRACT

A pressure-sensitive adhesive film, comprising a pressure-sensitive adhesive coated on the surface of a film backing, characterized in that the hardness of said film is within the range between H and 3B determined by a pencil scratch test according to JIS K 5400, and that said pressure-sensitive adhesive contains elastic microspheres with an elastic modulus ranging from $1 \times 10^4$ to $1 \times 10^7$ dyn/cm$^2$.

5 Claims, 1 Drawing Sheet

DECORATIVE FILM WITH PSA FOR EASY APPLICATION

This is a continuation of application Ser. No. 08/211,192 filed as PCT/US94/03180, Mar. 23, 1994, now abandoned.

TECHNICAL FIELD

The present invention relates to a pressure-sensitive adhesive film coated with a pressure sensitive adhesive, which is favorably used as a pressure-sensitive a decorative film or the like. More specifically, the present invention relates to a pressure-sensitive adhesive film which does not trap the air when used, and which is capable of easily pushing out the air occasionally trapped between the pressure-sensitive adhesive film and an adherend.

BACKGROUND OF THE INVENTION

Hitherto, when a pressure-sensitive film to be used for a purpose such as decoration is applied to an adherend, air is often trapped between the pressure-sensitive film and the adherend, which has caused a risk of degrading the external appearance of the adherend. In order to avoid the above defect, a good deal of skill is required, and even if this defect can be eliminated by a skill, much labor is required for squeezing the film, so that a long time has been required for the application thereof.

In the pressure-sensitive adhesive sheet material disclosed in Japanese Examined Patent Publication (Kokoku) No. 44-17040 and the position-justifiable pressure-sensitive adhesive tape disclosed in Japanese Unexamined Patent Publication (Kokai) No. 3-181578, concavities are formed in a carrier or carrier web, and non-tacky materials or glass beads are provided in the formed concavities, whereby the pressure-sensitive adhesive is prevented from being in direct contact with the adherend, which results in slidability, and the application becomes easy. However, this pressure-sensitive adhesive sheet material and position-justifiable pressure-sensitive adhesive tape have the problems in that an additional step is required to provide concavities in a carrier or carrier web, that, after a film has been squeezed onto an adherend, the pressure-sensitive adhesive concavities disappear, and the adherend and the pressure-sensitive adhesive cease to be in point contact with each other, so that when air remains in the central part of the film, it becomes unescapable and so forth.

The pressure-sensitive adhesive composition disclosed in Japanese Examined Patent Publication (Kokoku) No. 45-17074 is obtained by mixing light, fragile and thin-walled glass beads with a liquid adhesive composition and applying the obtained mixture onto a sheet and drying it. The thus obtained pressure-sensitive adhesive having convex portions is sufficiently slidable and its application is therefore easy. However, this pressure-sensitive adhesive composition has the problem that, after a film has been squeezed onto an adherend, the pressure-sensitive adhesive convex parts disappear, and the adherend and the pressure-sensitive adhesive cease to be in point contact with each other, so that when air remains in the central part of the film, it becomes unescapable.

The gas permeable pressure-sensitive adhesive member disclosed in Japanese Unexamined Patent Publication (Kokai) No. 2-45582 has the structure that a porous gas-permeable substrate is provided with a gas-permeable pressure-sensitive adhesive layer containing hollow beads, and also with many micropores communicating with the pores in this substrate. Such a structure has the problems in that the kinds of usable substrates are limited because of the porosity of the substrate, that a specific equipment is required in order to partially eliminate the pressure-sensitive adhesive liquid from the side of the gas-permeable substrate by a gas blow method or air suction method after the coating of the pressure-sensitive adhesive, and so forth.

The wrapping adhesive tape disclosed in Japanese Unexamined Utility Model Publication (Kokai) No. 59-763 is intended for preventing the air from being trapped by partially providing an adhesive layer. This adhesive tape has the problem that, since a pressure-sensitive adhesive needs to be scattered by a dot system, a specific coating machine for this purpose is required.

The repeelable pressure-sensitive adhesive sheet disclosed in Japanese Unexamined Patent Publication (Utility Patent) No. 61-168146 is intended for obtaining repeelability by adding a specific amount of elastic microspheres with a specific size into a pressure-sensitive adhesive layer. However, the optimum range of the amount of added elastic microspheres is so wide that the above repeelable pressure-sensitive adhesive sheet cannot substantially be used for the usage of the present invention, requiring permanent adhesion, because of the low adhesive strength. In addition, in the above repeelable pressure-sensitive adhesive sheet, the particle diameter of the elastic microspheres is defined preferably within the range between 1 and 100 μm, so that this adhesive sheet is not suitable for the pressure-sensitive adhesive film which does not trap the air, intended by the present invention. Further, the sheet is not particularly limited, either, so that this repeelable pressure-sensitive adhesive sheet could not be used directly for the pressure-sensitive adhesive film intended by the present invention.

SUMMARY OF THE INVENTION

The present invention provides a pressure-sensitive adhesive film free from such various problems as described above, which can be very easily produced and easily cause the air trapped between the film and an adherend to escape when the film is applied to the adherend.

A pressure sensitive adhesive film, comprising a pressure-sensitive adhesive coated on the surface of a film backing, characterized in that the hardness of said film is within the range between H and 3B determined by a pencil scratch test according to JIS K 5400, and that said pressure-sensitive adhesive contains elastic microspheres with an elastic modulus ranging from $1\times10^4$ to $1\times10^6$ dyn/cm$^2$.

Since the pressure-sensitive adhesive layer is present on the surface of the film backing and many elastic microspheres are dispersed in the pressure-sensitive adhesive layer, the surface of the pressure-sensitive adhesive layer is not smooth, and many projections are formed owing to the presence of the microspheres. On account of this structure of the present pressure-sensitive adhesive film, when this adhesive film is placed on an adherend surface, the adherend surface and the surface of the pressure-sensitive pressure-sensitive adhesive are not closely adhered to each other on all over the surfaces, so that many air passages are formed between these surfaces. Accordingly, when the pressure-sensitive adhesive film is to be squeezed onto the adherend surface by a squeegee or the like, the air trapped between the pressure-sensitive adhesive film and the adherend surface can be easily eliminated through these air passages, whereby the application work of the pressure-sensitive adhesive film becomes very much facilitated.

DESCRIPTION OF PREFERRED EMBODIMENTS

Figure 1:
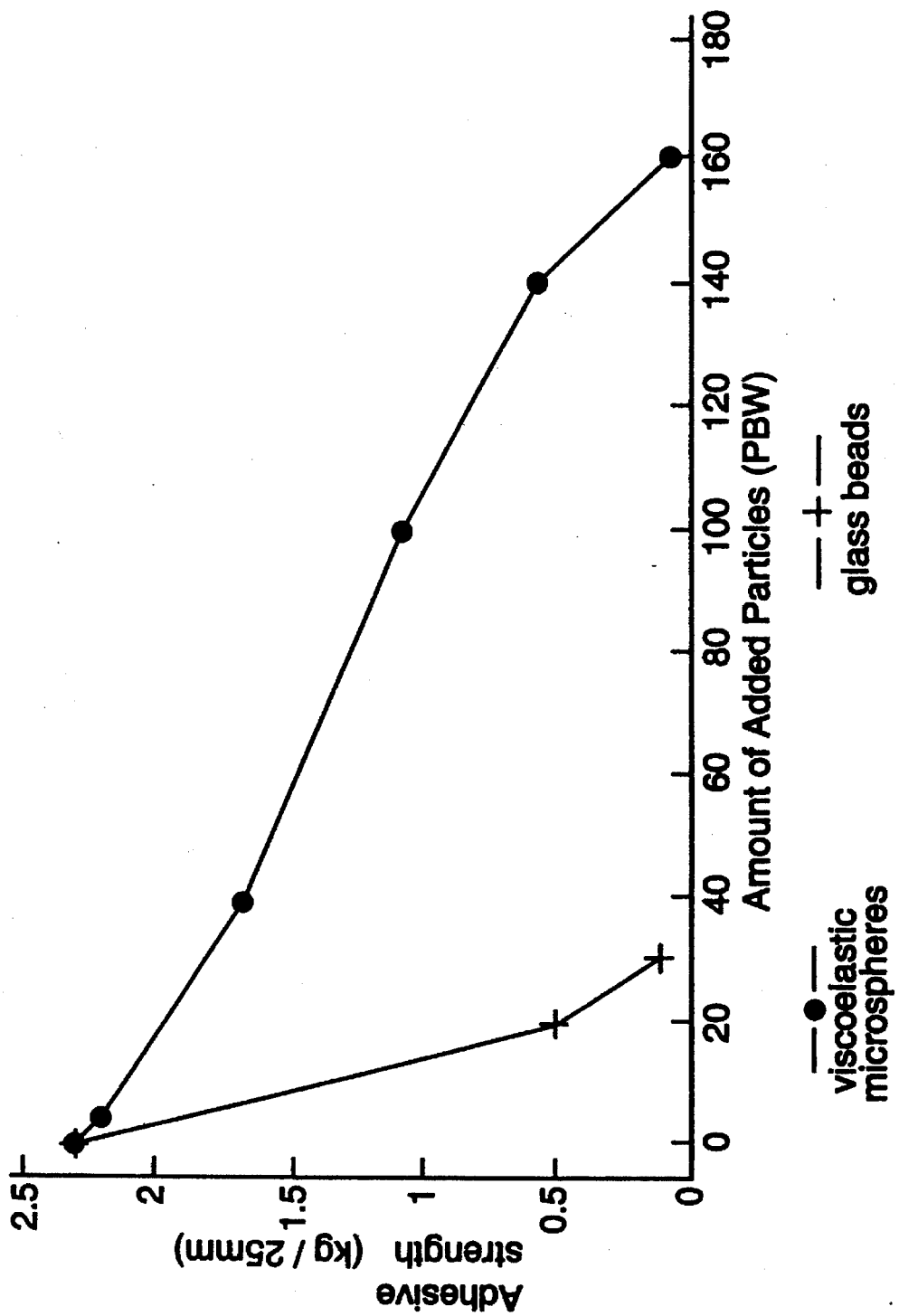
FIG. 1 is a graph illustrating the interrelation between the amount of the added elastic microspheres of the present invention or that of glass beads in the prior art, and the adhesive strength of the pressure-sensitive adhesive film.

In order to solve the aforesaid problem, the present invention provides a pressure-sensitive adhesive decorative film, in which a pressure-sensitive adhesive is applied onto the surface of a film backing, characterized in that the hardness of said film is within the range between H and 3B as determined by a pencil scratch test according to JIS K5400, and said pressure-sensitive adhesive contains elastic microspheres with an elastic modulus ranging from $1 \times 10^4$ to $1 \times 10^6$ dyn/cm$^2$. That is, by use of a specific film backing, and by incorporating an appropriate amount of elastic microspheres with an elastic modulus within the aforesaid range in the pressure-sensitive adhesive, a suitable roughness can be provided on the surface of the pressure-sensitive adhesive, so that the air trapped by the film can easily be escaped through the apertures formed on the adherend surface and the irregular parts formed owing to the surface roughness of the pressure sensitive adhesive, and the air is seldom trapped between the pressure-sensitive adhesive film and the adherend when the film is applied to the adherend.

In addition, microspheres with an elastic modulus within such a range as above are easily deformed in the horizontal direction under a squeezing pressure, which generates a force of extruding the air out of the film, and as a result, an air flow is produced, so that even if air is trapped by the film, it is easily pushed out from the film and never trapped by the film, when the film is applied onto the surface of an adherend.

The reason why the elastic modulus is limited within the range between $1 \times 10^4$ and $1 \times 10^6$ dyn/cm$^2$ is that when the elastic modulus is less than $1 \times 10^4$ dyn/cm$^2$, it is difficult to retain a fixed spherical shape, and when the elastic modulus exceeds $1 \times 10^6$ dyn/cm$^2$, it becomes difficult for the microspheres to be properly deformed when the pressure-sensitive adhesive film is applied to an adherend, and it consequently becomes difficult to push the air forward. The elastic modulus can be determined by an ordinary viscoelasticity-measuring equipment, as a storage elastic modulus obtainable when an object to be tested is subjected to a fixed vibration in the shear direction thereof, and this elastic modulus is a value at a temperature of 25° C.

In addition, in the present invention, the decorative film backing plays an important role. That is, by use of a film with a hardness ranging from H and 3B determined by a pencil scratch test according to JIS K 5400, it becomes possible for the air to be even less likely to be trapped between the film and an adherend, and even if air is trapped therein, it becomes possible to easily push it out to the outside of the film.

The reason why the hardness of the film is limited within the aforesaid range is that when this film has a hardness higher than the pencil hardness of H, the elastic modulus of the film is too high for the film to conform to the adherend surface, and air bubbles are likely to be incorporated between the film and the adherend, owing to the roughness of the adherend surface, and when the hardness of the film is lower than 3B, the film is easily deformed, and it becomes impossible to effectively deform the elastic microspheres, so that air is likely to be trapped between the film and the adherend, which may permit the trapped air to be confined between the film and the adherend.

Therefore, the present invention can solve the aforesaid problem by a combination of a specific film backing and a pressure-sensitive adhesive.

The kinds of film backing are limited, in the present invention, to those, the hardness of the film of which is within the range between H and 3B determined by a pencil scratch test according to JIS K 5400. The reason therefore is that air is likely to be trapped between the film and an adherend, in any of the cases where the hardness of the film is higher than H and where it is lower than 3B.

The hardness of the film backing can be varied by changing the material of the film or the amount of added plasticizer. For example, for a vinyl chloride resin, there can be used, as a plasticizer, dibutyl phthalate (DBP), di(2-ethylhexyl) phthalate (DOP), tricresyl phosphoric ester (TCP) or the like, and a plasticizer is added to the film backing in a proportional amount ranging preferably from 15 to 50 parts by weight, more preferably from 20 to 40 parts by weight based on 100 parts by weight of the vinyl chloride resin. The reason therefore is that, when the amount of the added plasticizer is within the range between 15 and 50 parts by weight, bleeding or the like of a plasticizer can be effectively prevented and a hardness within the aforesaid range is obtained, and when this amount is within the range between 20 and 40 parts by weight, an appropriate viscosity of a film backing is obtained, which facilitates the production of the film backing.

As the concrete examples of film backing, there may be mentioned polyvinyl chloride resins, polyester resins, polyacrylic resins, teflon type resins, polyolefinic resins, and the like.

Especially polyvinyl chloride resins have the advantages that they are suitable as film backings because printing may easily be effected on the surface thereof, and that they can be used even outdoors, for they are inexpensive and possess a proper weather resistance. In addition, in the present invention, there may be used film backings, the reverse side of which has been subjected to an embossing treatment, or which has been subjected to a surface treatment for protection or peeling. Furthermore, the thickness of the film backing is desirably within the range between −50 and 1500 μm, in view of availability, although it is not particularly limited.

Next, there will be made explanations about the elastic microspheres used in the present invention. The pressure applied to the pressure-sensitive adhesive film when the film is squeezed by a squeegee or the like is about 15 kg/cm$^2$, and the elastic microspheres used in the present invention have such a strength as they are not crushed under this pressures. As the material of such elastic microspheres, there can be used an acrylic resin, silicon resin, urethane resin, vinyl acetate type resin, teflon type resin, polyamide resin, vinyl chloride resin, styrenic resin, phenol resin, epoxy resin, styrene-butadiene-styrene block copolymer resin, styrene-ethylene-butylene-styrene block copolymer resin, styrene-isoprene-styrene block copolymer resin, NBR, chloroprene rubber, natural rubber, and the like.

Especially acrylic resins are excellent in weather resistance and therefore suitable as decorative materials which can be used even outdoors, and desirable also in view of availability of microspheres, in that elastic microspheres can be obtained from acrylic resins easily and inexpensively by suspension polymerization. In addition, acrylic resins have another advantage that, since the Tg value and elastic modulus thereof are easily controllable owing to the abundance of the kinds of monomers and cross-linking agents, a proper adhesive strength can be obtained at room temperature, while the microspheric shape is retained, and that even when the elastic microspheres are added to a pressure-sensitive adhesive, the adhesive strength is not greatly lowered.

In addition, as the principal ingredient of the pressure-sensitive adhesive, there are often used acrylic resins, because acrylic resins are generally inexpensive and have a high adhesive strength. When acrylic elastic microspheres are used in the case of such a pressure-sensitive adhesive, there can be obtained also the advantage that the density becomes uniform and dispersion becomes very easy. Further, the elastic microspheres may be hollow ones composed of these resins or ones having voids therein, because those type of microspheres cause elastic deformations more easily.

As an acrylic resin suitable for the formation of elastic microspheres, there may be mentioned copolymers of acrylate and acrylic acid, e.g.:

2-ethylhexyl acrylate/acrylic acid (99/1 to 90/10) copolymers (Tg=−69° to −60° C.);
n-butyl acrylate/acrylic acid (99/1 to 90/10) copolymers (Tg=−54° to −45° C.);
isononyl acrylate/acrylic acid (99/1 to 90/10) copolymers (Tg=−81° to −72° C.);
ethyl acrylate/acrylic acid (99/1 to 90/10) copolymers (Tg= −21° to −13° C.); and the like.

In addition, as acrylic ester monomer constituting an acrylic resin, there can be used isooctyl acrylate, isobutyl acrylate, 2-methylbutyl acrylate, and the like, and in place of acrylic acid, other α-olefin carboxylic acids, e.g. methacrylic acid and the like can be used. Even when these α-olefin carboxylic acids are to be used, the weight ratio of acrylate to α-olefin carboxylic acid is preferably within the range between 99/1 and 90/10.

It is also possible to use a bifunctional acrylate e.g. 1,4-butyl-2-diacrylate divinylbenzene or the like as a component of the monomer, so as to effect crosslinking. By addition of any of these crosslinking agents, in general, the modulus of rigidity of the adhesive is increased, while the tack thereof is reduced. Therefore, in order that the adhesive may have an appropriate tack, the crosslinking agent should be added in a proportional amount of 0.5 part by weight or less, preferably 0.1 part by weight or less based on 100 parts by weight of the monomer.

For acrylic resins and even in other resins, there may be used crosslinked type resins or non-crosslinked type resins as the material for the elastic microspheres. In addition, in the case of crosslinked resins, the crosslinking may be either a crosslinking by covalent bonding or a physical crosslinking. Crosslinked type resins are desirable for the reasons that wide-ranging kinds of organic solvents may be used as the solvent for coating liquid of the pressure-sensitive adhesive, that drying is easy, or the like. In addition, a styrene-butadiene-styrene block copolymer resin, ionomer resin or the like is preferable in the point that such a resin maintains a fixed microspherical shape without being dissolved in any of certain kinds of solvents selected, and an appropriate elastic force is obtained. Further, even non-crosslinked type resins are desirable, if any of them is used for an emulsion type pressure-sensitive adhesive, in the point that an appropriate elastic force is obtained while a fixed microspheric shape is maintained, and that the problems such as toxicity of the organic solvent can be solved.

The Tg value of the material for the elastic microspheres is preferably lower than room temperature, because an appropriate tack is obtained at room temperature and a high tack is obtained as the whole pressure-sensitive adhesive of the pressure-sensitive adhesive film.

Although the process for the production of microspheres is not particularly limited herein, the microspheres can be obtained by suspension polymerization, emulsion polymerization, seed polymerization or the like.

The volume average diameter of the microspheres is within the range between 100 µm and 300 µm, preferably about 150 µm and 300 µm. The reason why the volume average diameter is limited in the aforesaid range is that when the volume average diameter is smaller than 100 µm, the air trapped between the adherend and the pressure-sensitive adhesive sheet cannot be effectively caused to escape when the pressure-sensitive adhesive sheet is applied to the adherend.

The volume average diameter and number-average diameter of the elastic microspheres were obtained in a way such that 1000 microspheres were subjected to measurement by use of an image-processing device according to optical microscopic method, and calculations were effected according to the following equations.

$$\text{volume average particle diameter} = \{\Sigma(n_i)(d_i)^4\}/\{\Sigma(n_i)(d_i)^3\}$$

$$\text{number average particle diameter} = \{\Sigma(n_i)(d_i)\}/\{\Sigma(n_i)\}$$

wherein n is the number of microspheres, and d is the diameter (µm) of measured microspheres.

In the present invention, the elastic microspheres may be monodispersed in the pressure-sensitive adhesive, or may form clusters in each of which 2 or more microspheres are agglomerated. Because, owing to the cluster structure formed by the microspheres, the air which has effectively been trapped can be easily caused to escape. Such clusters can be formed by preliminarily adding microspheres to a solution of a pressure-sensitive adhesive through a binding agent such as gelatin, gum arabic, and alcohol, and subsequently coating the solution. Such clusters can also be formed by utilization of recoagulative effect produced at the time of drying in the coating step, by selecting suitable drying conditions.

The size of a cluster is desirably within the range between 2 and 100 as the number of microspheres. When the number of microspheres exceeds 100, the tack varies widely or the area where there are no microspheres becomes enlarged, and it is feared that the trapped air should become hard to be caused to escape.

In addition, elastic microspheres may be either of hollow and non-hollow type ones, or may have many voids on the surfaces of the microspheres and within the microspheric particles.

These particles can be formed by varying the aforesaid production conditions and kinds of monomers. Concretely, they can be formed by the process described in Japanese Unexamined Patent Publication (Kokai) No. 2-194079.

In the following, there will be made explanations about the pressure-sensitive adhesive used in the present invention.

As the pressure-sensitive adhesive to be used in the present invention, there may be used, specifically known pressure-sensitive adhesives such as acrylic resins, rubber type resins, silicon type resins, and vinyl acetate resins, although the kinds of the pressure-sensitive adhesives are not particularly limited.

The weight ratio between the pressure-sensitive adhesive and the elastic microspheres is within the range between 10 and 150 parts by weight of the elastic microspheres based on 100 parts by weight of the solid content of the pressure-sensitive adhesive. When the weight ratio of the elastic microspheres is smaller than the lowest limit of the above range, the projected surfaces of the microspheres becomes almost smoothened, so that the air bubbles become hard to be caused to escape, and when the weight ratio of the microspheres exceeds 150 parts by weight, the tack of the pressure-sensitive adhesive is lowered, and it becomes difficult for a pressure-sensitive adhesive film to be securely applied to an adherend.

The coating weight of the mixture of the pressure-sensitive adhesive and the elastic microspheres is within the range between 25 and 100 g/m². When the coating weight is less than 25 g/m², it is difficult for the pressure-sensitive adhesive film to be securely applied to an adherend, and when the coating weight exceeds 100 g/m², it becomes difficult for the air bubbles to be caused to escape.

For the production of a pressure-sensitive adhesive film of the present invention, it suffices, if a pressure-sensitive adhesive is first mixed with elastic microspheres in a predetermined proportion, and the obtained mixture is coated onto a baking sheet and then dried according to the conventional method. The coating is effected by, e.g., a knife coater, gravure coater, roll coater, or the like. The drying after the coating is effected for a period of time ranging from 3 to 10 minutes at a temperature ranging from 80° to 100° C.

In the pressure-sensitive adhesive film of the present invention, satisfying the aforesaid conditions, there is a pressure-sensitive adhesive layer on the surface of the film backing, and many elastic microspheres are dispersed in the pressure-sensitive adhesive layer, and therefore, the surface of the pressure-sensitive adhesive layer is not smooth, and many projected portions are formed thereon owing to the presence of the microspheres. Therefore, when the pressure-sensitive adhesive film is placed on the surface of an adherend, the adherend surface and the surface of the pressure-sensitive adhesive are not closely adhered to each other all over the surfaces, so that many air passages are formed between these surfaces. Accordingly, when the pressure-sensitive adhesive film is squeezed onto an adherend surface by a squeegee or the like, the air trapped between the pressure-sensitive adhesive and the adherend surface can be easily eliminated through the thus formed air passages, so that the application working for the pressure-sensitive adhesive becomes very easy.

Furthermore, the elastic microspheres are deformed right and left owing to the pressure applied by the squeegee, so as to form an air flow, and the trapped air is effectively extruded to the outside. In addition, in the pressure-sensitive adhesive film of the present invention, since the microspheres can be properly deformed, it becomes unnecessary to strictly limit the interrelation between the thickness of coated pressure-sensitive adhesive and the diameter of the microspheres, and consequently, the production conditions become loosened, so that the present pressure-sensitive adhesive film has important advantages also with regard to the production thereof.

In the following, the present invention will be explained more concretely with reference to the working examples.

Isooctyl acrylate and acrylic acid (96/4) were suspension polymerized in an aqueous medium, whereby microspheres having a volume average diameter set forth in Table 1 were formed.

As a pressure-sensitive adhesive, there was used an acrylic pressure-sensitive adhesive, "SK Dyn E-1000" (produced by Soken Kagaku K.K.).

As a decorative film backing, there was used a vinyl chloride film with a pencil hardness of HB and a thickness of 180 μm, in Table 1, and, in Table 2, there was used a vinyl chloride film set forth in this table. The hardiness of a polyvinyl chloride based film was determined according to JIS K 5400.

The aforesaid microspheres and pressure-sensitive adhesive were mixed in predetermined proportional amounts, respectively, and each of the mixtures was sufficiently stirred, following which it was coated in an amount such that the coating thickness of each mixture might reach a predetermined value after drying the coated mixture, and the coated mixture was dried for 5 minutes at a temperature of 100° C., so that a separator was superposed thereon.

A sample of 10×10 cm, stripped of the release liner, was placed on a flat and smooth acrylic plate, and squeezed toward their center of the pressure-sensitive adhesive film, such that air bubbles were gathered. On the thus gathered air bubbles, there was rolled a roll of 2 kg, so as to observe how the air bubbles were pushed out.

In the above instance, the cases where air bubbles were completely pushed out air indicated by the mark o, the cases where air bubbles partially remained are indicated by the mark Δ, and the cases where considerably many air bubbles remained by the mark x.

A sample with a width of 25 mm was mounted onto a bonderized steel plate by use of a roller of 2 kg at a temperature of 20° C. and a relative humidity of 65%. The thus mounted sample was aged for 48 hours at a relative humidity of 65%, whereupon the peeling strength of the sample was measured at a peeling angle of 90° and a peeling rate of 300 m/min.

On the other hand, as a comparative example, glass beads as particles (produced by 3M Co., Ltd. in U.S.A.; particle size: 50 to 90 μm) were added to SK Dyn E-1000 in proportional amounts 20 and 30 parts by weight, respectively, based on 100 parts by weight of this acrylic pressure-sensitive adhesive, whereupon adhesive strength and the like of the sample were measured.

These results are set forth in Table 1, Table 2 and FIG. 1,

In addition, the elastic moduli of the elastic microspheres were prepared by varying the amount of added crosslinking agent, and with respect to each of the elastic moduli, there was observed how the air bubbles were pushed out, in the same manner as described above.

TABLE 1

|  | Particles | Volume Average Particle Diameter (μm) | Elastic Modulus dyn/cm² | Amount Added (parts by weight) | Coating weight (g/m²) | Escapability of Bubbles | Adhesive Strength (kg/25 mm) |
| --- | --- | --- | --- | --- | --- | --- | --- |
| Ex. 1 | elastic microsperes | 115 | $5 \times 10^5$ | 20 | 52 | o | 2.2 |
| Ex. 2 | elastic microsperes | 168 | $5 \times 10^5$ | 40 | 67 | o | 1.7 |
| Ex. 3 | elastic microsperes | 157 | $5 \times 10^5$ | 15 | 63 | o | 2.2 |
| Ex. 4 | elastic microsperes | 157 | $5 \times 10^5$ | 140 | 67 | o | 0.6 |

TABLE 1-continued

|  | Particles | Volume Average Particle Diameter (μm) | Elastic Modulus dyn/cm² | Amount Added (parts by weight) | Coating weight (g/m²) | Escapability of Bubbles | Adhesive Strength (kg/25 mm) |
| --- | --- | --- | --- | --- | --- | --- | --- |
| Ex. 5 | elastic microsperes | 168 | 5 × 10⁵ | 40 | 29 | ○ | 0.7 |
| Ex. 6 | elastic microsperes | 158 | 5 × 10⁵ | 40 | 50 | ○ | 1.7 |
| Ex. 7 | elastic microsperes | 160 | 3 × 10⁴ | 40 | 50 | ○ | 2.0 |
| Ex. 8 | elastic microsperes | 165 | 6 × 10⁵ | 40 | 50 | ○ | 2.1 |
| Ex. 9 | elastic microsperes | 157 | 5 × 10⁵ | 100 | 50 | ○ | 1.1 |
| Comp. Ex. 1 | elastic microsperes | 92 | 5 × 10⁵ | 20 | 50 | x | 2.1 |
| Comp. Ex. 2 | elastic microsperes | 168 | 5 × 10⁵ | 40 | 112 | x | 2.4 |
| Comp. Ex. 3 | elastic microsperes | 157 | 5 × 10⁵ | 5 | 70 | x | 2.2 |
| Comp. Ex. 4 | elastic microsperes | 157 | 5 × 10⁵ | 160 | 63 | ○ | 0.1 |
| Comp. Ex. 5 | elastic microsperes | 168 | 5 × 10⁵ | 40 | 22 | ○ | 0.4 |
| Comp. Ex. 6 | elastic microsperes | 150 | 1 × 10⁷ | 40 | 51 | Δ | 1.1 |
| Comp. Ex. 7 | elastic microsperes | 140 | 5 × 10³ | 40 | 50 | x | 1.8 |
| Comp. Ex. 8 | glass beads | 50–90 | — | 20 | 50 | x | 0.5 |
| Comp. Ex. 9 | glass beads | 50–90 | — | 30 | 50 | x | 0.1 |
| Comp. Ex. 10 | none | — | — | 0 | 50 | x | 2.3 |

TABLE 2

| | Film Backing | | | | | Escapability |
| --- | --- | --- | --- | --- | --- | --- |
| | | Plasticizer | | | Pencil | of Air |
| | Vinyl chloride resin | DOP | DBP | thickness | Hardness | Bubbles |
| Example | | | | | | |
| 10 | 100 | 15 | | 50 | 3H | ○ |
| 11 | 100 | 20 | | 100 | H | ○ |
| 12 | 100 | | 30 | 200 | HB | ○ |
| 13 | 100 | | 40 | 500 | 3B | ○ |
| Comparative Example | | | | | | |
| 11 | 100 | 12 | | 100 | 4H | x |
| 12 | 100 | 60 | | 200 | 4B | x |

\* volume average diameter of elastic microspheres    about 150 μm
   elastic modulus thereof    3 × 10⁵ dyn/cm²
   amount of added elastic microspheres    40 parts by weight
\* coating weight of pressure-sensitive adhesive    about 50 g/m²

It can be seen from the results of Comparative Example 1 that, since the volume average diameter of microspheres is below 100 μm, air bubbles are not sufficiently pushed out. In Example 1, since the average diameter of microspheres is 100 μm or more, under the same conditions as those in Comparative Example 1, the air bubbles are completely pushed out.

It can be seen from the results of Comparative Example 2 that, since the coating weight exceeds 100 g/m², the air bubbles are hardly pushed out. In Example 2, since the coating weight is 100 g/m² or less, under the same conditions as those in Comparative Example 2, the air bubbles are completely pushed out.

It can be seen from the results of Comparative Example 3 that, since the proportional amount, based on 100 parts by weight of the pressure-sensitive adhesive, of added elastic microspheres is less than 10 parts by weight, air bubbles are hardly pushed out. In Example 3, since the parts by weight of the elastic microspheres are 10 parts by weight or more, under the same conditions as those in Comparative Example 3, the air bubbles are completely pushed out.

It can be seen from the results of Comparative Example 4 that, since the parts by weight of the elastic microspheres are 150 parts by weight, the adhesive strength of the pressure-sensitive adhesive is too low to hold the film.

It can be seen from the results of Comparative Example 5 that, since the coating weight is less than 25 g/m², the adhesive strength of the pressure-sensitive adhesive is too low to hold the film. It can been seen from the results of Comparative Example 6 that, since the elastic modulus of the elastic microspheres is too high to enable proper deformation of the microspheres, the air bubbles are hardly pushed out. It can be seen from the results of Comparative Example 7 that the elastic modulus of the elastic microspheres is too low to retain a proper shape thereof, and as a result, airs are trapped and air bubbles are hardly pushed out.

It can be seen from the results of Comparative Example 8 or 9 that, since glass beads are used, air bubbles are hardly pushed out or the adhesive strength of the pressure-sensitive is extremely low.

It can be seen from the results of Comparative Example 10 that since no elastic microspheres are not added at all, air bubbles are hardly pushed out.

It can be seen from the results of Comparative Example 11 that, since the amount of the added plasticizer is too small, the pencil hardness of the pressure-sensitive adhesive film is too high to cause the air bubbles to escape.

It can be seen from the results of Comparative Example 12 that since too much amount of the plasticizer is added, the pencil hardness of the pressure-sensitive adhesive film is so low that the air bubbles are hardly pushed out, on the other hand. In addition, there is noticeably observed a migration of the plasticizer on the surface of the film.

I claim:

1. A pressure sensitive adhesive decorative film comprising a pressure sensitive adhesive is applied onto a surface of a decorative film backing wherein the hardness of said decorative film backing is within the range between H and 3B and said pressure sensitive adhesive contains elastic microspheres with an elastic modulus ranging from $1 \times 10^4$ to $1 \times 10^6$ dyne/cm$^2$ and the pressure sensitive adhesive containing elastic microspheres is coated onto the decorative film backing in a coating weight ranging from 25 to 100 g/m$^2$.

2. A pressure sensitive adhesive decorative film according to claim 1, wherein the volume average diameter of said elastic microsphere is within the range between 100 μm to 300 μm.

3. A pressure sensitive adhesive decorative film according to claim 1 wherein said microspheres are added to the pressure sensitive adhesive in a proportional amount ranging from 10 to 150 parts by weight based on 100 parts by weight of said pressure sensitive adhesive.

4. A pressure sensitive adhesive decorative film according to claim 1, wherein said microspheres have formed clusters.

5. A pressure sensitive adhesive film according to claim 1, wherein said microspheres contain voids or holes.

* * * * *